(12) United States Patent
Young

(10) Patent No.: US 7,726,901 B2
(45) Date of Patent: Jun. 1, 2010

(54) CONNECTING STRUCTURE FOR PANEL LIFT DEVICE

(75) Inventor: Roland O. Young, Grand Forks, ND (US)

(73) Assignee: Telpro, Inc., Grand Forks, ND (US)

( * ) Notice: Subject to any disclaimer, the term of this patent is extended or adjusted under 35 U.S.C. 154(b) by 1477 days.

(21) Appl. No.: 10/930,416

(22) Filed: Aug. 31, 2004

(65) Prior Publication Data

US 2006/0045615 A1  Mar. 2, 2006

(51) Int. Cl.
*F16M 11/38* (2006.01)

(52) U.S. Cl. .................. 403/353; 403/383; 403/169; 248/170; 248/188.7

(58) Field of Classification Search ............ 403/345, 403/353, 361, 363, 383, 169, 170, 171, 176; 248/170, 173, 129, 163.1, 165, 220.1, 166, 248/188.7, 188.8
See application file for complete search history.

(56) References Cited

U.S. PATENT DOCUMENTS

| | | | | |
|---|---|---|---|---|
| 1,335,726 A | * | 4/1920 | De Long ............... | 248/165 |
| 2,055,761 A | * | 9/1936 | Gerschefski ........... | 248/165 |
| 4,728,067 A | * | 3/1988 | Steinmetzer et al. ..... | 248/188.7 |
| 4,911,391 A | * | 3/1990 | Ellis .................. | 248/188.7 |
| 5,165,638 A | * | 11/1992 | Fallon et al. .......... | 248/188.7 |

* cited by examiner

*Primary Examiner*—Michael P Ferguson
(74) *Attorney, Agent, or Firm*—Neustel Law Offices

(57) ABSTRACT

A connecting structure detachably connects the upright post of a floor support to the upright frame supporting a panel lift device. The upright post has a pair of upright panels diverging forward to form a V shaped flange that has its lower portion open in front and a rounded knob mounted at the bottom of the post and spaced forward from the forward diverging V shaped flange. The post also has a pair of upright panels converging forward with upper portions of the panels tapering toward one another to form a pointed V shaped upper end. The frame has a forward diverging V shaped flange with an upper portion having dual pair of forward converging flanges in spaced relation to one another to form a forward converging V shaped slot. The upright frame has lower edges formed of a pair of upright rearward converging flanges to be detachably received in the rearward converging space between the rounded knob and V shaped flange of the post with the pointed upper end of the post detachably received in the V shaped slot of the frame for detachably mounting the post of the floor support to the upright frame of the panel lift device.

2 Claims, 2 Drawing Sheets

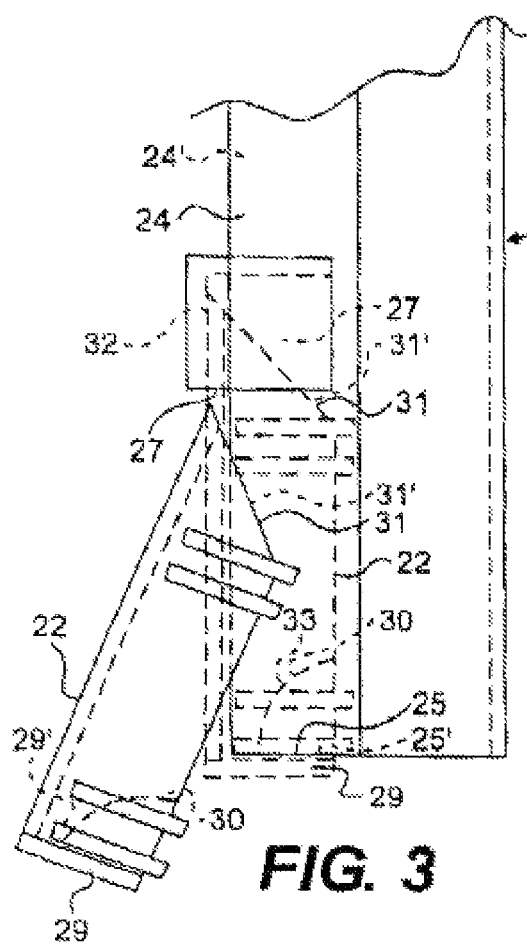
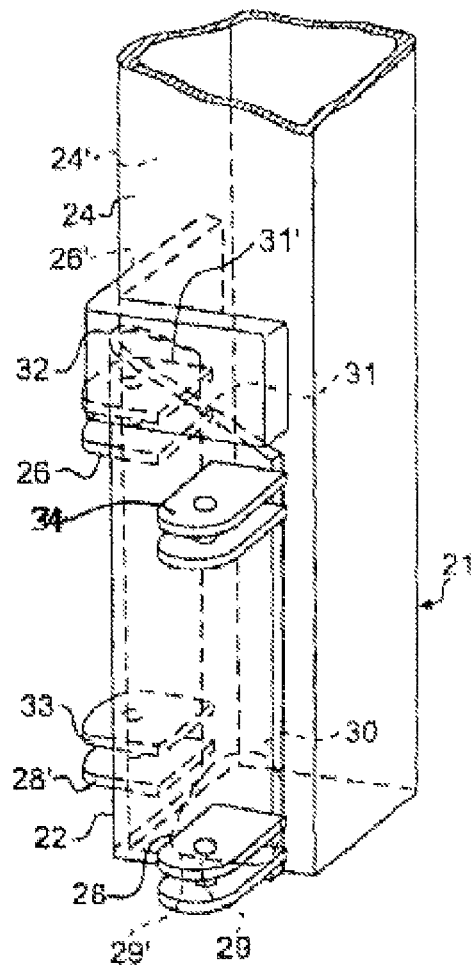
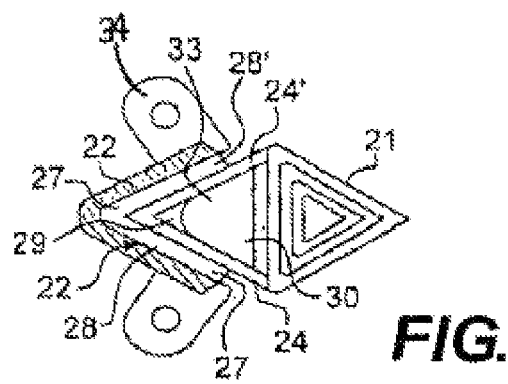
FIG. 3
FIG. 2
FIG. 4

CONNECTING STRUCTURE FOR PANEL LIFT DEVICE

BACKGROUND OF THE INVENTION

This invention relates to structure for attaching and detaching to tubular upright frame portion of a panel lift device to the post portion of the supporting base of the device. More particularly, the invention relates to structural improvement to more rapidly and accurately attaching the two components together.

BRIEF SUMMARY OF THE INVENTION

It is an object of the invention to provide a novel improved structure for attaching and detaching the main upright frame portion of a panel lift device to the post of the supporting base of the device which minimizes the likelihood of damaging the interconnecting components of the upright frame and post when attaching and detaching the two together.

It is a further object of the invention to provide a novel quick detachable structure which causes the upright frame to the post of the base of the panel lift device correctly without the common problems of damaging the components when incorrectly attempting to join the two together Further object and advantages of the invention will become apparent as the description proceeds and when taken in conjunction with the accompanying drawings wherein:

BRIEF DESCRIPTION OF THE DRAWINGS

FIG. 2 is an enlarged perspective view of the lower portion of the upright frame and base support.

FIG. 3 is a enlarged side view of the upright frame and base support shown before being attached together in solid lines and after being attached together with one component in phantom lines.

FIG. 4 is a cross sectional view of the two components taken along line 4-4 of FIG. 3 with both components shown in solid lines.

DETAILED DESCRIPTION OF THE INVENTION

Figure 1:
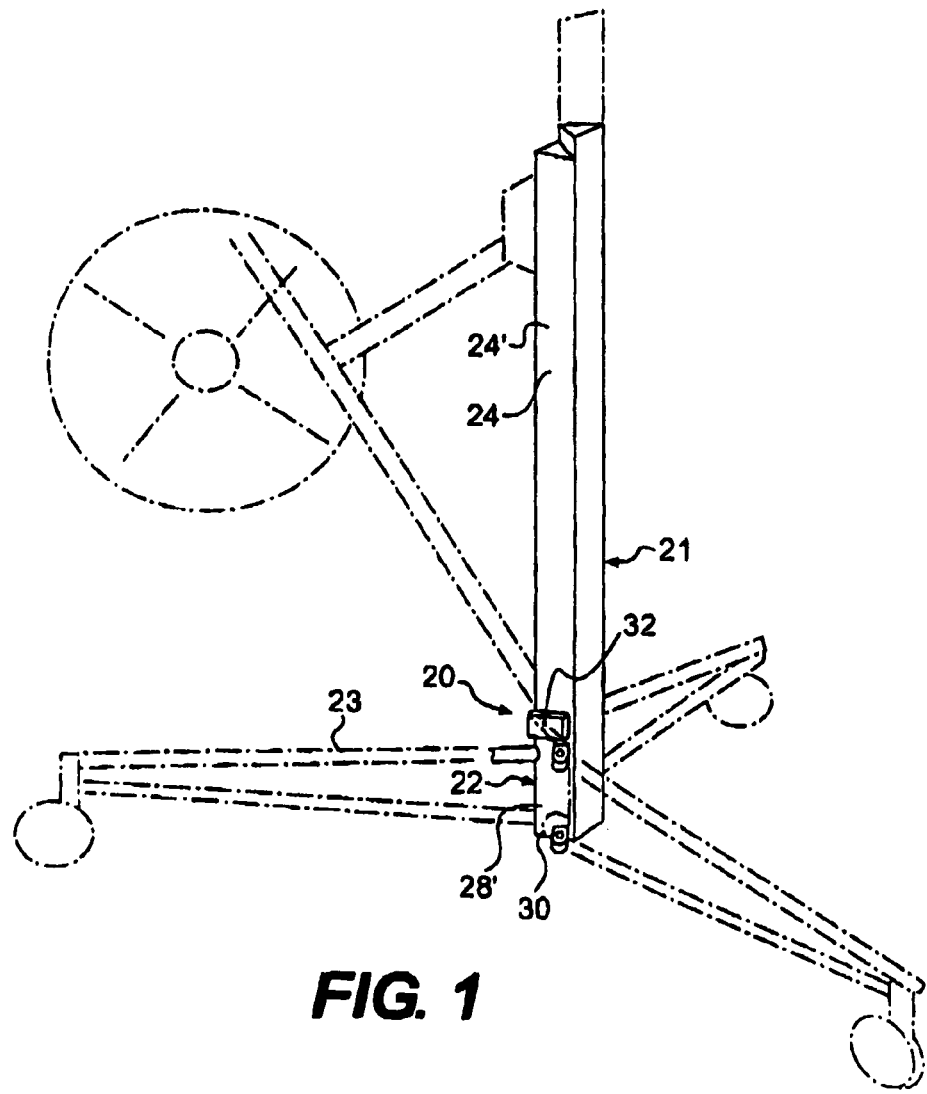
FIG. 1 is a perspective view of the upright frame and base support of a panel lift device illustrating the improved connecting structure of the two components of the panel lift device.

Briefly stated, the invention comprises a structural attachment improvement for more accurately and with less likelihood of damage attaching the upright center frame of a panel lift device to the fixed upright post of the floor support for the panel lift device.

Referring more particularly to the drawings in FIG. 1, the attachment improvement 20 is illustrated with the upright frame 21 of the panel lift device shown attached to the upright post 22 of the floor support 23 of the panel lift device via flanges 34 as shown in FIGS. 1 and 2 of the drawing.

The upright frame 21 is formed of a hollow square tubing with a front pair of upright panels 24 and 24' converging forward toward one another to form a V shape with V shaped lower edges 25 and 25'. The frame also has a pair of flanges 26 and 26' fixed in forward spaced parallel relation to an upper portions of the upright panels 24 and 24' to form a slot and opening 27 in the of the frame.

The corner post 22 has a pair of upright plates 28 and 28' with a base plate 29 fixed laterally to and across the bottom of the plates 28 and 28'. A rounded knob 30 is fixed to the base plate 29 of the post and projects upward. The knob 30 is spaced from the upright plates 28 and 28' to form a V shaped space 29'. The upper ends of the plates 28 and 28' are tapered along edges 31 and 31' to form a point 32.

To attach the post 22 to the upright frame 21, the pointed upper end 32 of the plates or flanges 28 and 28' are slid upward into the opening 27 of the slot formed by spaced panels 26 and 26' of the frame while the bottom portion of the plates of the post are slid toward the frame to be placed in flush parallel relation to the plates 24 and 24' of the frame after sliding the pointed end of the post into the slot of the frame. Thereafter the post is slid further upward relative to the frame until the lower edges 25 and 25' of the frame slid into the V shaped space 29' of the post and the frame lower edges 25 and 25' come to rest on the base plate 29 of the post as shown in FIG. 2.

The post 22 when attached to an operative position will have its V shaped plates 31 and 31' flush against the V shaped plates 24 and 24' of the frame 21, with the pointed upper end 32 of the post in the slot 27 of the frame 21 and the lower edges 25 and 25' of the frame plates 24 and 24' resting on the lateral panel 29, between the knob 30 and upright plates 28 and 28' as shown in FIG. 4.

The knob 30 is spaced from the side walls or upright plates 28 and 28' of the post 22 sufficiently to receive the lower edges 25 and 25' of plates 24 and 24' of frame 21 at the bottom of the flange portions 24 and 24' which form the corner of the upright frame for attachment of the post 22 thereto.

The knob 30 is rounded along its back portion 33 to facilitate the insertion of the lower corner edges 25 and 25' of plates 24 and 24' of frame 21 between the converging flange portions 28 and 28' downward past the knob 30 into the space 29' between the flanges 28 and 28' and the knob 30 when lower edges 25 and 25' are inserted downward onto the base plate 29 of the corner post to it position as shown in FIG. 2.

The pointed end 32 of the post makes it easier to mount the post to the upright flange without accidently missing the flanges 26 and 26' as the post is mounted first with the pointed end inserted up inside the flanges 26 and 26' the lower portion of the post is swung in until it is flush against the inside of the flanges 26 and 26' in parallel relation to flanges 24 and 24' and then post 22 is slid downward to cause the lower v edges 25 and 25' to engage plates 29 behind the rounded knob 30.

Consequently, when mounting the frame to the post or visa versa if the party doing the installation misses the slot of the frame and with the lower edge of the frame is received in the V shaped space, the rounding 33 of the back of the knob will prevent the frame from being held on the post in this event, as the frame will fall down and away from the knob because of the rounding of the knob. Also, by the upper end of the post being pointed if make it easier to attach the upper end of the post to the frame.

In the past, the upper end 32 of flanges 28 and 28' had square corners and was not tapered and as a result the corners would be become more easily bent while assembling or disassembling the frame to the post and it was more difficult to insert the square upper end of the post into the slotted flange of the frame. Thus, the upper end being pointed tends to eliminate the possibility of damage and also to make it easier to insert its pointed end into the slot of the upright frame when mounting the two together.

Also, in the past the knob was formed by two short rectangular upright plates converging in parallel relation to the frame and post, with square upper ends also making it easier to damage it.

Thus, it will be seen that a novel connecting structure has been provided between the post of the floor support of a panel lift with the supporting frame of the panel lift which easier to attach and detach and which is less likely to be attached in a wrong manner which might cause damage to the two components.

The frame of the panel lift device is customarily used to telescope drywall panels upward on telescoping sleeves in the frame.

It will be obvious that various changes and departures may be made to the invention without departing from the spirit and scope thereof, and accordingly, it is not intended that the invention be limited to that specifically described in the specification or as illustrated in the drawings but only as set forth in the appended claims wherein:

What is claimed is:

1. A detachable connecting structure for a panel lift, comprising:
    an upright leg support post adapted to be adjacent a floor surface, said upright leg support post comprising a base plate having an upright forward extending V-shaped flange extending longitudinally upwardly from a front edge of the base plate and a rounded knob extending upwardly from a rear side of the base plate and spaced from the flange;
    said V-shaped flange of the leg support post comprising a pair of upright panels converging horizontally to the front edge of the base plate and tapering toward one another in an upward longitudinal direction to form an upper pointed end, and having a pair of flanges extending from a front face of each upright panel of the V-shaped flange for attaching to a floor support; and
    an upright tubular post frame to support a panel lift device, said upright tubular post frame comprising tubular walls forming a tubular post having a longitudinal opening at a lower end of the tubular post and having a pair of adjacent front tubular walls defining a V-shaped lower front edge of the tubular post converging to the front and detachably matingly received by the leg support post in the space between the rounded knob and the V-shaped flange of the leg support post;
    said tubular post frame comprising a downwardly opening V-shaped flange attachment fixedly extending from said pair of adjacent front tubular walls and spaced forward of the V-shaped lower front edge of the tubular post and converging to the front and in spaced parallel relation to the adjacent front tubular walls of the tubular post frame forming a slotted opening for the upper pointed end of the V-shaped flange of the leg support post to be detachably received therebetween to detachably mount the upright leg support post to the tubular post frame when the lower front edge of the tubular post is received in the space between the rounded knob and the V-shaped flange of the leg support post.

2. A detachable connecting structure for a panel lift, comprising:
    an upright leg support post adapted to be adjacent a floor surface, said upright leg support post comprising a base plate having an upright forward extending outwardly convex flange extending longitudinally upwardly from a front edge of the base plate and a rounded knob extending upwardly from a rear side of the base plate and spaced from the flange;
    said convex flange of the leg support post comprising a pair of upright panels converging horizontally to the front edge of the base plate and extending in an upward longitudinal direction to form an upper free end, and having a pair of flanges extending from a front face of each upright panel of the convex flange for attaching to a floor support; and
    an upright tubular post frame to support a panel lift device, said upright tubular post frame comprising tubular walls forming a tubular post having a longitudinal opening at a lower end of the tubular post and having a pair of adjacent front tubular walls defining a convex lower front edge of the tubular post converging to the front and detachably matingly received by the leg support post in the space between the rounded knob and the convex flange of the leg support post;
    said tubular post frame comprising a downwardly opening convex flange attachment fixedly extending from said pair of adjacent front tubular walls and spaced forward of the convex lower front edge of the tubular post and converging to the front and in spaced parallel relation to the adjacent front tubular walls of the tubular post frame forming a slotted opening for the upper free end of the convex flange of the leg support post to be detachably received therebetween to detachably mount the upright leg support post to the tubular post frame when the lower front edge of the tubular post is received in the space between the rounded knob and the convex flange of the leg support post.

* * * * *